United States Patent [19]

Hedges et al.

[11] 4,415,723
[45] Nov. 15, 1983

[54] RANDOMLY BRANCHED AROMATIC POLYCARBONATE FROM TRIPHENOL

[75] Inventors: Charles V. Hedges, Mt. Vernon; Victor Mark, Evansville, both of Ind.

[73] Assignee: General Electric Company, Mt. Vernon, Ind.

[21] Appl. No.: 359,987

[22] Filed: Mar. 19, 1982

[51] Int. Cl.³ .................................... C08G 63/62
[52] U.S. Cl. ............................ 528/204; 528/196; 568/718; 568/720
[58] Field of Search .......................... 528/204, 196

[56] References Cited

U.S. PATENT DOCUMENTS

| | | | |
|---|---|---|---|
| 2,964,797 | 12/1960 | Peilstocker et al. | 528/204 |
| 3,062,780 | 11/1962 | Rinke et al. | 528/204 |
| 3,544,514 | 12/1970 | Schnell et al. | 260/47 |
| 3,644,538 | 2/1972 | Starnes | 568/720 |
| 4,009,148 | 2/1977 | Neuray et al. | 528/204 |
| 4,277,600 | 7/1981 | Mark et al. | 528/204 |

OTHER PUBLICATIONS

English Language Translation: Ed. Lippmann, Condensation of Chloroacetone with Phenols, Chemische Berichte, 1912, pp. 2489–2491.
Zaheer et al., Reactions of α-Halogeno-ketones with Aromatic Compounds Part I, J. Chem. Soc., pp. 3360–3362, 1954.
Zaheer et al., Reactions of α-Halogeno-ketones with Aromatic Compounds Part II, J. Chem. Soc., pp. 1706–1708, (1954).

Primary Examiner—Harold D. Anderson
Attorney, Agent, or Firm—Martin B. Barancik

[57] ABSTRACT

This invention relates to triphenolic compounds that may be used as branching agents for the manufacture of novel randomly branched polycarbonates. The polycarbonates are useful for the fabrication of blow molded articles.

4 Claims, No Drawings

RANDOMLY BRANCHED AROMATIC POLYCARBONATE FROM TRIPHENOL

This invention relates to triphenolic compounds that may be used as branching agents for the manufacture of randomly branched novel polycarbonates. These randomly branched polycarbonates are colorless, have excellent thermal resistance, excellent light stability, enhanced hydrolytic stability and high melt strength as compared to other branched polycarbonates. These desirable properties make the novel branched polycarbonates particularly useful for the fabrication of blow molded articles although they may be employed for diverse molding applications.

BACKGROUND OF THE INVENTION

Polycarbonates are well known, commercially important materials which are produced in large quantities. Such polymers are typically prepared by reacting a carbonate precursor with a dihydric phenol to provide a linear polymer consisting of units of the dihydric phenol linked to one another through carbonate linkages. These polymers have outstanding mechanical, thermal, and optical properties such as high tensile strength, optical clarity (transparency), thermal and dimensional stability and impact strength.

These aromatic polycarbonates differ from most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. However, in contrast to most thermoplastic polymers, polycarbonates prepared from dihydric phenols exhibit Newtonian flow at normal processing temperatures and shear rates below 300 reciprocal seconds.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding. Non-Newtonian flow characteristics tend to impart melt elasticity and melt strength to polymers thus allowing their use in blow molding fabrication. In the usual blow molding operation, a tube of a molten thermoplastic is extruded vertically downward into a mold, followed by the introduction of a gas, such as air, into the tube thus forcing the molten plastic to conform to the shape of the mold. The length of the tube and the quantity of material forming the tube are limiting factors in determining the size and wall thickness of the object that can be molded by this process. The fluidity of the melt obtained from bisphenol-A polycarbonate, or the lack of melt strength as well as the paucity of extrudate swelling, serve to limit blow molding applications to relatively small, thin walled parts. Temperatures must generally be carefully controlled to prevent the extruded tube from falling away before it attains the desired length and the mold is closed around it for blowing. Consequently, the Newtonian behavior of polycarbonate resin melts has severely restricted their use in the production of large hollow bodies by conventional extrusion blow molding operations as well as the production of various other shapes by profile extrusion methods.

Thermoplastic randomly branched polycarbonates exhibit unique properties of non-Newtonian flow, melt elasticity and melt strength which permit them to be used to obtain such articles as bottles which were not heretofore easily or readily produced with linear polycarbonates. The thermoplastic, randomly branched polycarbonates can be prepared by reacting a polyfunctional compound containing three or more functional groups with a dihydric phenol and a carbonate precursor.

Branched polycarbonates derived from triphenolic and tetraphenolic are known in the prior compounds art.

U.S. Pat. No. Re. 27,682 describes a number of triphenolic and tetraphenolic branching agents for use in making branched polycarbonates. That patent discloses that 1,1,1-tris(4-hydroxyphenyl)ethane may be used as such a branching agent. The applicants have found that the use of that triphenolic branching agent as well as other branching agents result in colored resins.

This is in sharp contract with the applicants novel branched polycarbonates which are colorless resins.

DESCRIPTION OF THE INVENTION

This invention is directed to triphenolic compounds and novel branched polycarbonates prepared therefrom. The triphenolic compounds are of the formula:

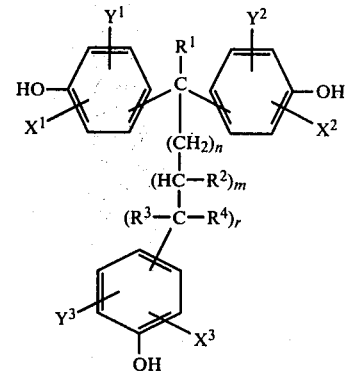

wherein $X^1$, $X^2$, $X^3$, $Y^1$, $Y^2$, and $Y^3$ are independently selected from the group consisting of hydrogen, chlorine, bromine, lower alkyl of from 1 to 6 carbon atoms; $R^1$, $R^2$, $R^3$ and $R^4$ are independently selected from the group consisting of hydrogen, lower alkyl of from 1 to 6 carbon atoms; and n is an integer of 0, 1, 2, 3, 4, 5 and 6; m and r are integers of 0, 1 or 2 with the proviso that the sum of $n+m+r$ is at least 1 and mixtures of said triphenolic compounds.

Preferred triphenolic compounds include those of the following formula as well as mixtures of the following formula:

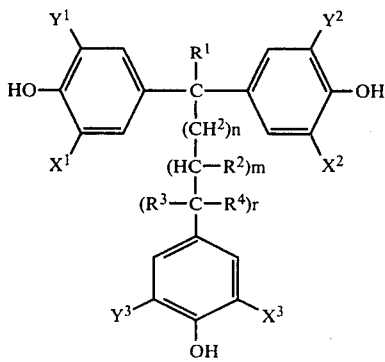

wherein $X^1$, $X^2$, $X^3$, $Y^1$, $Y^2$, $Y^3$, $R^1$, $R^2$, $R^3$, $R^4$, n, m and r are the same as hereinabove defined with the same proviso.

The preferred triphenolic compounds include:
1,1,2-tris(4-hydroxyphenyl)propane
1,1,2-tris(4-hydroxyphenyl)ethane
1,1,2-tris(3,5-dimethyl-4-hydroxyphenyl)propane
1-(4-hydroxyphenyl)-2,2,-bis(3,5-dimethyl-4-hydroxyphenyl)butane
1,1,3-tris(2-methyl-4-hydroxyphenyl)propane
1-(2-hydroxyphenyl)-3,3-bis(4-hydroxyphenyl)propane
1-(4-hydroxyphenyl)-2,2-bis(3-chloro-4-hydroxyphenyl)butane
1-(4-hydroxyphenyl)-5,5-bis(3-methyl-4-hydroxyphenyl)hexane
1-(3-chloro-4-hydroxyphenyl)-2,2-bis(3-methyl-4-hydroxyphenyl)butane.

The term alkyl includes both straight and branched chain alkyl groups such as methyl; ethyl; n-propyl; isopropyl; n-butyl; isobutyl; tert-butyl; n-hexyl and the like. The term cycloalkyl includes cyclobutyl; cyclohexyl; di-methylcyclohexyl and the like.

This invention also embraces the novel randomly branched polycarbonates that are made by copolymerizing the triphenolic compounds with one or more dihydric phenols. These novel randomly branched polycarbonate compositions have an I.V. of about 0.3 to 1.0 dl/g. as measured in methylene chloride at 25° C.

The triphenolic compounds may be obtained from the starting alpha-halocarbonyl compounds or the equivalents such as the appropriate haloketones, haloaldehydes, aldehyde, ketal, hemiketal or other suitable precursors and a monofunctional phenol under either acidic or alkaline condensing conditions.

The condensation reaction is best carried out by utilizing the phenolic reactant in excess of the stoichiometric amount. With phenols that are solid at ambient temperature, this method requires reaction temperatures near or above the melting point of the phenol that is used in excess. In addition, non-phenolic solvents, such as acetic acid, acetic anhydride, methylene chloride, can be used.

The reaction temperature encompasses ambient temperatures to elevated temperatures, such as 100° C., or higher. Although the reaction rate is faster at higher temperatures, there is also an increase in undesired by-products, such as isomeric triphenols, which are less effective than the entirely p-substituted triphenols in the copolymerization reaction with the diphenols.

The condensation reaction can be carried out either at atmospheric or superatmospheric pressures.

The progress of the condensation reaction can be monitored by chromatographic or spectroscopic methods.

The reaction can be followed readily by infrared (ir) spectroscopy by the diminution or disappearance of the carbonyl band, a very strong, characteristic and diagnostic ir band, well suitable for qualitative and quantitative analysis.

Similarly, proton nuclear magnetic resonance spectroscopy can sometimes be used at great advantage: an increase of resonance peaks in the aromatic region that are characteristic of the product, and not the precursor, can yield a readily available, quantitative information via integration of the specific aromatic and aliphatic region signals.

When X represents chlorine or bromine substituents, the novel triphenols can also be prepared by direct halogenation, in solution or suspension, of the corresponding non-halogenated triphenols. Methylene chloride, chloroform, acetic acid, water, other non-reactive liquids and aqueous sodium hydroxide solution may be used as solvents or dispersants. The degree of halogenation can readily be followed by gas or liquid chromatography, ir or proton nmr.

It is readily apparent that the modes in which the triphenolic compounds are synthesized may result in isomeric mixtures due to the fact that phenolic compounds are capable of reacting preferably at the carbon that is ortho or para to the phenolic hydroxyl group. The halogenated triphenolic compounds may also be present as mixtures if an isomeric mixture of triphenolic compounds is used as a starting material and/or if the mixture of isomers that result from the halogenation of evan a pure triphenolic isomer.

The phenolic moieties on the invention's novel compounds may be similarly substituted or they may be "mixed," i.e., one or more of these moieties may have different substituents.

Purification, of the triphenolic compounds can be carried out by recrystallization, elution chromatography, or other methods known to those skilled in the art. Preferred solvents of recrystallization are methylene chloride, benzene, cyclohexane, methanol, ethanol and alcohol-water mixtures. Elution chromatography is carried out best over alumina or silica, using a variety of solvents as eluants.

In the preparation of the novel thermoplastic randomly branched polycarbonates of this invention, the amount of the triphenolic compound which is reacted with the dihydric phenol and the carbonate precursor is critical to the extent that the amount employed must be sufficient to produce a true thermoplastic randomly branched polycarbonate which is substantially free of crosslinking. If an amount of triphenolic compound employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ about 0.01 to about 3.0 and more particularly, about 0.01 to about 1.0 mole percent of the triphenolic compound, based upon the total moles of dihydric phenol.

The dihydric phenols that can be employed in the practice of this invention include bis(4-hydroxyphenyl)methane, 1,1-bis(4-hydroxyphenyl)ethane, 2,2- bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxy-3-chlorophenyl)propane, 2,2-bis(4-hydroxy-3,5-dibromophenyl)-propane, 1,1-bis(4-hydroxyphenyl)cyclohexane, p,p'-dihydroxydiphenyl, 3,3'-dichloro-4,4'-dihydroxydiphenyl, bis(4-hydroxyphenyl)ether, bis(4-hydroxyphenyl)sulfone, bis(3,5-dimethyl-4-hydroxyphenyl)sulfone, resorcinol, hydroquinone; 1,4-hydroxy-2,5-dichlorobenzene, 1,4-dihydroxy-3-methylbenzene, bis(4-hydroxyphenyl)sulfoxide, bis(4-hydroxyphenyl)sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more dibasic acids in the event a polycarbonate copolymer or copolyestercarbonate rather than a homopolymer is desired for use in the preparation of the branched polymers of this invention. The preferred dihydric phenol is bisphenol-A.

The carbonate precursor employed can be either a carbonyl halide, a haloformate or a diaryl carbonate. Thus the carbonyl halides can be carbonyl chloride, carbonyl bromide, and mixtures thereof. The haloformates suitable for use include mono- or bishaloformates of dihydric phenols (bischloroformates of hydroquinone, monochloroformate of bisphenol-A, etc.) or bishaloformates of glycols (bishaloformates of ethylene glycol, neopentyl glycol, polyethylene glycol, etc.). When using bishaloformates, equimolar amounts of free dihydric phenols are required to effect polymerization. When polymerizing monohaloformates of diphenols no free diphenol is required. While other carbonate precursors will occur to those skilled in the art, carbonyl chloride, also known as phosgene is preferred.

The polymerization of dihydric phenols to high molecular weight polycarbonates may be carried out by an conventional method known in the art. For example, phosgene can be introduced into a solution of the diphenol in organic bases, such as pyridine, triethylamine, dimethylaniline or into solutions of the diphenol in organic bases, such as pyridine, triethylamine, dimethylaniline or into solutions of the diphenol in suitable organic solvents, such as benzene, toluene, chlorobenzene, methylene chloride, carbon tetrachloride and the like, with the addition of acid binding agents.

In the most widely practiced polymerization process phosgene is introduced into an aqueous solution of the alkali metal salt of the diphenol in the presence of methylene chloride and a phase-transfer catalyst as well as a molecular weight regulator, usually a monofunctional phenol. One advantage of the instant invention is that the triphenolic branching agent has the same reactivity profile as the diphenol used to make the linear chains, hence it can be added, in the desired amount, not only later but together with the diphenol at the beginning of the polymerization process. In other words, the triphenolic compounds can be formulated directly into the reaction mixture to be polymerized to branched polycarbonates.

The reaction between the halogen containing carbonate precursor and the dihydric phenol and the triphenolic branching agent when carried out by the interfacial method in accordance with this invention is conducted in the presence of an inert organic solvent which is essentially immiscible with water and does not deleteriously affect the formed polymer. Examples of suitable organic solvents ae methylene chloride, ethylene dichloride and chlorobenzene.

In a preferred variant of the polymerization process, the branching triphenol is added in the form of an aqueous solution of its alkali metal salt. This is possible since the novel triphenols of the instant invention are capable of forming stable aqueous solutions in the form of their alkali salts. The novel branching agent may also be formulated into the reaction mixture of the dihydric phenol to be polymerized in finely divided solid form or as a methylene chloride solution or slurry. In either form it is copolymerized readily in the polycarbonate forming process and becomes a fully incorporated segment.

The alkali metal hydroxide which can be employed in the polymerization process can be any of the alkali metal hydroxides selected from the groups consisting of the alkali group and the alkaline earth groups. Specifically, these include potassium hydroxide, sodium hydroxide, lithium hydroxide, calcium hydroxide, magnesium hydroxide and the like.

The interfacial, or phase transfer catalysts, which can be employed in the polymerization process can be any of the suitable catalysts that aid the polymerization of dihydric phenols with phosgene. Suitable catalysts include tertiary amines such as triethylamine, tripropylamine, N,N-dimethylaniline and the like; quaternary ammonium compounds such as tetraethylammonium chloride, cetyl triethyl ammonium bromide, tetra-n-heptylammonium iodide, tetra-n-propyl ammonium chloride tetramethylammonium chloride, tetramethylammonium hydroxide, tetra-n-butylammonium iodide, benzyltrimethylammonium chloride and the like; and quaternary phosphonium compounds such as n-butyltriphenyl phosphonium bromide and tetrabutyl phosphonium chloride and the like.

The molecular weight regulators which can be employed in the interfacial process include monohydric phenols such as phenol, chroman-I [4-(2,4,4-trimethylchromanyl)phenol], p-t-butylphenol, p-cumylphenol, and the like. Preferably, phenol is employed as the weight regulator.

An effective amount of a molecular weight regulator that will give modified melt flow value (KI) of 3,000 to 50,000 centiseconds, preferably from 5,000 to 30,000 centiseconds may be used. Generally, it is preferred to use from 2–5 mol%, and more preferably from 2.5–4.5 mol% of phenol as the molecular weight regulator.

It is sometimes desirable to introduce reducing agents, such as sodium dithionite into the aqueous system in order to suppress the formation of colored contaminants.

The aqueous interfacial polymerization method may be carried out at temperatures from ambient to about 50° C. However, higher temperatures are within the scope of this invention since the instant method is not temperature dependent.

The diphenol/triphenol mixture can be converted into branched polycarbonates also by esterification with dialkyl, alkylaryl or diaryl carbonates at elevated temperatures from about 50° C. to about 325° C., at atmospheric or at reduced pressure, in neat form, or in the presence of neutral diluents or in the presence of transesterification catalysts, such as metal oxides, hydroxides, and carbonates. Phenols are generated in the transesterification process, so that no molecular weight regulators need be added to the reaction mixture. In fact the degree of polymerization is controlled by the extent of removal of the monohydroxylic coproducts, such as alcohols or phenols.

The branched polycarbonates, when produced according to the instant invention by the interfacial polymerization technique, were recovered from the washed, neutral methylene chloride phase by steam precipitation and drying and were fed into an extruder operating at 265° C. and the extrudates were comminuted into pellets. When prepared by the transesterification method, the polycarbonate melt was directly converted into extrudate and pellets.

While some of the physical-mechanical measurements can be carried out directly with the polycarbonate powder or pellets, some tests require molded specimens. To provide these, the pellets are injection molded at about 315° C., into test bars according to the dimensions required by the test method, such as the notched Izod impact test carried out according to ASTM D-256.

The following test procedures were utilized:

Intrinsic viscosity (I.V.) was determined in methylene chloride solution at 25° C. and is given as deciliters per gram (dl/g).

Molecular weight determinations (number average, $M_n$; weight average, $M_w$ and Z-average, $M_z$), were carried out on Waters Associates GPC Model 200, in methylene chloride solution.

Modified melt flow (K.I.) values, expressed in centiseconds, were obtained by an automated ASTM D-1238 procedure at 300° C. on a Tinius Olsen Melt Indexer, Model T-3, Condition 0.

Melt index ratio (M.I.R.), which is the ratio of melt flow rates at two different shear levels, and is a measure of the non-Newtonian property of the polymer, was obtained on the Tinius Olsen Melt Indexer described above. The M.I.R. values of linear Newtonian polycarbonates are typically less than 1.4, while those of the branched polycarbonates are typically higher than 1.5.

The branched polycarbonates produced according to the instant invention are soluble in selected organic solvents and can be worked into shaped articles from solutions, such as into films. Being thermoplastic, these branched polycarbonates, can be easily fabricated by conventional shaping methods from melt, such as by extrusion, molding, blow-molding, lamination and the like.

The branched polycarbonates of the invention may be combined with other polycarbonates or with thermoplastic polyesters such as polyethylene terephthalate or poly (1,4-butylene terephthalate). In addition, these branched polycarbonates may be combined with reinforcing fillers such as filamentous glass or with non-reinforcing fillers, mold release agents, flame retardants, impact modifiers, extrusion aids, light stabilizers, flame retardants, foaming agents, such as those disclosed in U.S. Pat. No. 4,263,409 and Ger. Offen. No. 2,400,086 which are incorporated by reference and the like if desired.

DESCRIPTION OF THE PREFERRED EMBODIMENTS

The following examples are set forth to illustrate the invention and are not to be construed to limit the scope of the invention.

EXAMPLE 1

A round bottomed, 3 neck flask was used to dissolve 55.5 g (0.6 mol) of chloroacetone in 564.0 g (6 mols) of melted phenol. Hydrogen chloride gas was sparged into the reaction mixture while the reaction mixture was kept between 30°-48° C. with vigorous stirring. The hydrogen chloride was stripped off and crystals of 1,1,2-tris(4-hydroxyphenyl)propane were separated by vacuum filtration. The crystals were washed with methylene chloride and air dried on paper to yield 71.6 g of product. An additional amount of triphenol was obtained after the phenol was stripped off. Recrystallization from aqueous methanol yielded white crystals of m.p. 215°-216.5° C.

EXAMPLE 2

In a 30 l glass reactor (Corning QVF Stock No. V230/12) was placed 2280.0 g (10 mols) of bisphenol-A; 7.0 liters of methylene chloride; 5.5 liters of water; 28 ml of triethylamine; 33.0 g (3.5 mol%) of phenol and 11.8 g (0.37 mol%) of the 1,1,2-tris(4-hydroxyphenyl)propane prepared in Example 1. The polymerization was carried out by sparging in phosgene at a rate of 30.0 g/minute for 43 minutes. The reaction mixture was diluted with 6 liters of methylene chloride and the randomly branched polymer was recovered using standard techniques and was found to have an I.V. of 0.604 dl/g as measured in methylene chloride at 25° C. This polymer had a K.I. of 16,375; an M.I.R. of 2.19; ⅛" notched Izod 17.2 ft. lb. (100% ductile); Heat Distortion Temp. (264 psi) 263.3° F.

EXAMPLE 3

Using the same general procedure of Example 1, the compound 1,1,2-tris(3,5-dimethyl-4-hydroxyphenyl)-propane was made from chloroacetone and 2,6-xylenol. The melting point was 207°-209° C.

EXAMPLE 4

Using the same general procedure of Example 1, the compound 1,1,2-tris(3-methyl-4-hydroxyphenyl) propane was made from chloroacetone and orthocresol. The melting point was 225°-226.5° C.

EXAMPLE 5

Using 15.0 g of methoxyacetaldehyde dimethyl acetal and 200.0 g of melted phenol as reactants and hydrogen chloride gas as a catalyst, at a temperature of about 50°-65° C., 1,1,2-tris(4-hydroxyphenyl)ethane was obtained. This compound may be used as a branching agent.

EXAMPLE 6

A branched polycarbonate was made from 11.7 g (03.7 mol%) 1,1,2-tris(4-hydroxyphenyl)propane; 2280.0 g (10 mol%) of bisphenol-A; 30.1 g (3.2 mol%) of phenol in a reaction mixture which contained 7 liters of methylene chloride; 5.5 liters of water; and 20.2 g of triethylamine. The polymerization was carried out by sparging phosgene into the reactor at a rate of 30 g/min. for about 42 minutes. The polymer was separated from the reaction mixture and was found to have an I.V. of 0.659 dl/g as measured in methylene chloride at 25° C. The branched polymer had a K.I. of 29,060; a ⅛" Izod impact strength of 16.0 (100% ductile); a Yellowness Index of 1.0 (sunlamp); hydrolytic stability (% light transmission) 0 hour—80.0; 24 hours—77.5; 48 hours—75.2; and 72 hours—74.2 and 96 hours—73.2.

EXAMPLE 7

Using 15.8 g of 6-methyl-5-heptane-2-one and 200.0 g of melted phenol as reactants with hydrogen chloride gas as a catalyst at a temperature of about 80°–96° C., there was obtained in nearly quantitative yield a mixture of 2,2,5-tris(4-hydroxyphenyl)-6-methylheptane and 2,2,6-tris(4-hydroxyphenyl)-6-methylheptane. These two compounds were formed in 33% and 67% yield respectively and had GC elution times of 22.3 and 25.9 minutes relative to the reference compound p-cumylphenol which emerged at 15.0 minutes. These compounds either alone or as a mixture may be used as polycarbonate branching agents.

EXAMPLE 8

Using a cold water bath to control the exothermic reaction and 12.8 g of acrolein dimethyl acetal and 200.0 g of melted phenol as reactants with hydrogen chloride gas as a catalyst, there was obtained a mixture of 1,1,3-tris(4-hydroxyphenyl)propane and 1,1,2-tris(4-hydroxyphenyl)propane. These compounds either alone or as a mixture may be used as polycarbonate branching agents.

EXAMPLE 9

Using 41.1 g of 4(4-hydroxyphenyl)-2-butanone and 170.0 g of melted phenol as reactants at a temperature of 42°–52° C. in the presence of hydrogen bromide gas as a catalyst there was obtained 1,3,3-tris(4-hydroxyphenyl) butane. This compound may be used as a polycarbonate branching agent.

COMPARATIVE EXAMPLE A

A polycarbonate was made with 11.3 g (0.37 mol%) of 1,1,1-tris(4-hydroxyphenyl)ethane (m.p. 241°–244° C.); 5 lbs (10 mols) of bisphenol-A; 33.0 g (3.5 mol%) of phenol in the presence of 28 ml of triethylamine. The polymerization was carried out according to general procedure of Example 2. The polymer obtained was a pale green-yellow resin.

COMPARATIVE EXAMPLE B

A polycarbonate was prepared from 14.1 g (0.37 mol%) 1,1,2-tris(4-hydroxyphenyl)-1-phenylethane (m.p. 268°–270.5° C.); 5 lbs (10 mols) of bisphenol-A; 33.0 g (3.5 mol%) of phenol in the presence of 28 ml of triethylamine. The polymerization was carried out according to the general procedure of Example 2. The polymer obtained was an orange-red resin.

Obviously, other modifications and variations of the present invention are possible in light of the above teachings. It is, therefore to be understood that changes may be made in the particular embodiment of the invention described which are within the full intended scope of the invention as defined by the appended claims.

We claim:

1. A composition comprising a high molecular weight, thermoplastic randomly branched polycarbonate derived from an aromatic dihydric phenol, a carbonate precursor, and a branching component in an amount sufficient to produce a thermoplastic randomly branched polycarbonate which is substantially free of crosslinking; said randomly branched polycarbonate having an intrinsic viscosity of about 0–3 to 1.0 dl/g in methylene chloride at 25° C. wherein the branching component comprises one or more compounds of the formula

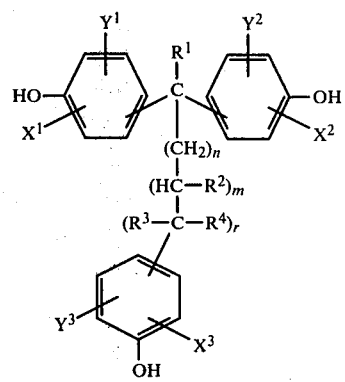

wherein $X^1$, $X^2$, $X^3$, $Y^1$, $Y^2$, and $Y^3$ are independently selected from the group consisting of hydrogen, chlorine, bromine, lower alkyl of from 1 to 6 carbon atoms; $R^1$, $R^2$, $R^3$ and $R^4$ are independently selected from the group consisting of hydrogen, lower alkyl of from 1 to 6 carbon atoms; and n is an integer of 0, 1, 2, 3, 4, 5 and 6; m and r are integers of 0, 1 or 2 with the proviso that the sum of $n+m+r$ is at least 1 and mixtures of said triphenolic compounds.

2. A high molecular weight, thermoplastic, randomly branched polycarbonate as defined in claim 1 wherein the compound is 1,1,2-tris(4-hydroxyphenyl)propane.

3. A high molecular weight, thermoplastic, randomly branched polycarbonate as defined in claim 1 wherein the compound is 1,1,2-tris(4-hydroxyphenyl)ethane.

4. A high molecular weight, thermoplastic, randomly branched polycarbonate as defined in claim 1 wherein the compound is 1,1,2-tris(3,5-dimethyl-4-hydroxyphenyl)propane.

* * * * *